United States Patent
Goto

(10) Patent No.: US 7,594,733 B2
(45) Date of Patent: Sep. 29, 2009

(54) CONVERGING SHEET, SURFACE LIGHT SOURCE UNIT, AND TRANSMISSION TYPE DISPLAY

(75) Inventor: Masahiro Goto, Tokyo-To (JP)

(73) Assignee: Dai Nippon Printing Co., Ltd., Shinjuku-Ku (JP)

( * ) Notice: Subject to any disclaimer, the term of this patent is extended or adjusted under 35 U.S.C. 154(b) by 94 days.

(21) Appl. No.: 11/372,248

(22) Filed: Mar. 9, 2006

(65) Prior Publication Data

US 2006/0227323 A1 Oct. 12, 2006

(30) Foreign Application Priority Data

Mar. 16, 2005 (JP) .............................. 2005-075280

(51) Int. Cl.
- G09F 13/04 (2006.01)
- G09F 13/08 (2006.01)
- F21V 7/04 (2006.01)
- F21V 5/00 (2006.01)

(52) U.S. Cl. .................. 362/97.1; 362/97.4; 362/618; 362/612; 362/245; 362/330

(58) Field of Classification Search ................... 362/97, 362/617–620, 622, 624, 627, 97.1–97.4, 362/612, 245, 330
See application file for complete search history.

(56) References Cited

U.S. PATENT DOCUMENTS

| | | | | |
|---|---|---|---|---|
| 5,196,960 A | * | 3/1993 | Matsuzaki et al. | 359/453 |
| 5,751,478 A | * | 5/1998 | Yoshimura et al. | 359/453 |
| 6,130,777 A | * | 10/2000 | Yamashita et al. | 359/456 |
| 6,261,664 B1 | * | 7/2001 | Beeson et al. | 428/141 |
| 6,280,063 B1 | * | 8/2001 | Fong et al. | 362/333 |
| 6,333,817 B1 | * | 12/2001 | Kashima et al. | 359/599 |
| 6,572,961 B1 | * | 6/2003 | Koyama et al. | 428/323 |
| 6,577,358 B1 | * | 6/2003 | Arakawa et al. | 349/57 |
| 6,891,677 B2 | | 5/2005 | Nilsen et al. | |
| 6,913,365 B2 | * | 7/2005 | Masaki et al. | 362/627 |
| 6,981,791 B2 | * | 1/2006 | Higashiyama | 362/600 |
| 7,160,018 B2 | * | 1/2007 | Chen et al. | 362/620 |
| 7,224,525 B2 | * | 5/2007 | Osawa | 359/453 |
| 2002/0012169 A1 | * | 1/2002 | Kashima | 359/495 |
| 2003/0184993 A1 | * | 10/2003 | Yamada | 362/31 |
| 2007/0279935 A1 | * | 12/2007 | Gardiner et al. | 362/610 |

FOREIGN PATENT DOCUMENTS

| | | |
|---|---|---|
| CN | 1434928 A | 8/2003 |
| JP | 2004-191611 A1 | 7/2004 |
| JP | 2004-311250 A1 | 11/2004 |

\* cited by examiner

*Primary Examiner*—Jong-Suk (James) Lee
*Assistant Examiner*—David J Makiya
(74) *Attorney, Agent, or Firm*—Burr & Brown

(57) ABSTRACT

A converging sheet includes a light-emerging-side lens member formed of a plurality of unit lenses of convex shape that are arranged on a light-emerging side, and a scattering layer that is formed along a surface of each unit lens and scatters light. The scattering layer includes light diffusing particles. A thickness t of the scattering layer is equal to or more than one-tenth the lens pitch p. The converging sheet satisfies the following relationships: $d \times ((t+h+p)/\phi) > 50\%$ and $d \times (t/\phi) < 50\%$, in which d represents a volume ratio (%) of the light diffusing particles mixed in the scattering layer relative to the scattering layer, $\phi$ represents an average grain diameter (mm) of the light diffusing particles, and h represents a height from the apex to a bottom of the convex shape of the unit lens.

23 Claims, 8 Drawing Sheets

25°C

60°C

CONVERGING SHEET, SURFACE LIGHT SOURCE UNIT, AND TRANSMISSION TYPE DISPLAY

BACKGROUND OF THE INVENTION

1. Field of the Invention

The present invention relates to a converging sheet used for illuminating a liquid crystal display, to a surface light source unit, and to a transmission type display using the converging sheet and the surface light source unit.

2. Background Art

A variety of surface light source units used to illuminate transmission type liquid crystal displays or the like from their rear have been proposed and put into practical use. These surface light source units are broadly classified into the edge light type and the direct type, according to the mode of conversion of a non-surface light source to a surface light source.

For example, in a surface light source unit of a direct type, light is introduced from its rear side by means of arc tubes arranged in parallel. The arc tubes and an LCD panel are positioned with a suitable space therebetween. In this space, there are placed a diffusing sheet and a combination of two or more sheets for converging light.

Such a conventional surface light source of a direct type is poor in light-converging properties although a large number of optical sheets are needed. In order to solve this problem, the structure of the LCD panel is improved so that even light that is obliquely incident on the display can produce an image of excellent qualities.

However, this conventional way of improvement causes reduction in optical efficiency, and complicates the structure of the LCD panel, which results in increase in costs.

In particular, the surface light source unit of direct type has a disadvantage in that the light intensity (luminance) on an LCD panel tends to be non-uniform depending on the distance from the arc tubes (i.e., whether a certain point on the LCD panel is close to the arc tube or to the space between the arc tubes arranged in parallel). A possible method of avoiding the non-uniformity is to increase a space between the arc tubes and the LCD panel. However, this method undesirably increases a thickness of the display. Another possible method of avoiding the non-uniformity is to increase a degree of diffusion or to control the amount of transmitting light. However, this method is disadvantageous in that the amount of usable light is decreased.

Specifically, Japanese Patent Laid-Open Publications No. 119703/1993 and No. 242219/1999, for example, disclose a surface light source provided with a light-shielding member (e.g., a lighting curtain or a light-shielding dot layer) so as to maintain the uniformity in light intensity. This method has been disadvantageous in that the amount of usable light is decreased, as stated above.

Japanese Patent Laid-Open Publication No. 347613/1994 proposes use of a sheet having lenticular lenses disposed on both surfaces. However, this structure is not intended to converge light, but intended to control a diffusion of light in two directions. Thus, optical axis on every area of the LCD panel changes according to the position relative to the arc tubes. Therefore, this method has been disadvantageous in that the brightness of light varies depending on the position from which the display screen is observed.

SUMMARY OF THE INVENTION

An object of the present invention is to provide a converging sheet, a surface light source unit, and a transmission type display that can attain uniform illumination so that the brightness of light on the display screen appears uniform regardless of the position from which the display screen is observed.

The present invention achieves the object by the below-described means. Although the description is made referring to the reference numbers corresponding to the examples of the present invention in order to facilitate understanding, the present invention is not limited thereto.

The present invention is a converging sheet disposed in a surface light source unit containing a light source member, having a sheet face and converging light from the light source member, the converging sheet comprising: a light-emerging-side lens member formed of a plurality of unit lenses of convex shape that are arranged on a light-emerging side at a predetermined lens pitch; and a scattering layer that is formed along a surface of each unit lens, and scatters light.

In the converging sheet according to the present invention, a thickness of the scattering layer may be equal to or more than one-tenth the lens pitch, and equal to or less than the lens pitch.

In the converging sheet according to the present invention, the scattering layer may include light diffusing particles mixed in the scattering layer so as to scatter light.

In the light converging sheet according to the present invention, the converging sheet may satisfy the relationship: $d \times ((t+h+p)/\phi) > 50\%$, in which d represents a volume ratio (%) of the light diffusing particles mixed in the scattering layer relative to the scattering layer, $\phi$ represents an average grain diameter (mm) of the light diffusing particles, t represents a thickness (mm) of the scattering layer near an apex of the convex shape of the unit lens, p represents the lens pitch at which the unit lenses are arranged, and h represents a height from the apex to a bottom of the convex shape of the unit lens.

In the converging sheet according to the present invention, the converging sheet may satisfy the relationship: $d \times (t/\phi) < 50\%$, in which d represents a volume ratio (%) of the light diffusing particles mixed in the scattering layer relative to the scattering layer, $\phi$ represents an average grain diameter (mm) of the light diffusing particles, and t represents a thickness (mm) of the scattering layer near an apex of the convex shape of the unit lens.

In the converging sheet according to the present invention, each of the unit lenses may be a part of an elliptic cylinder with a major axis thereof perpendicular to the sheet face, or a spheroid formed by rotating an ellipsoid with a major axis thereof perpendicular to the sheet face, the ellipsoid being rotated about the major axis.

The present invention is a surface light source unit disposed on a rear side of a transmission type display member, comprising: a light source member formed of a plurality of light sources arranged in parallel; and a converging sheet having a sheet face and converging light from the light source member; wherein the converging sheet comprises: a light-emerging-side lens member formed of a plurality of unit lenses of convex shape that are arranged on a light-emerging side at a predetermined lens pitch; and a scattering layer that is formed along a surface of each unit lens, and scatters light.

In the surface light source unit according to the present invention, the converging sheet may converge vertical light from a screen of the transmission type display member.

In the surface light source unit according to the present invention, the surface light source unit may further comprise: a second converging sheet converging light in a direction perpendicular to the direction in which light is converged by the converging sheet.

In the surface light source unit according to the present invention, a thickness of the scattering layer may be equal to or more than one-tenth the lens pitch, and equal to or less than the lens pitch.

In the surface light source unit according to the present invention, the scattering layer may include light diffusing particles mixed in the scattering layer so as to scatter light.

In the surface light source unit according to the present invention, the converging sheet may satisfy the relationship: $d \times ((t+h+p)/\phi) > 50\%$, in which d represents a volume ratio (%) of the light diffusing particles mixed in the scattering layer relative to the scattering layer, $\phi$ represents an average grain diameter (mm) of the light diffusing particles, t represents a thickness (mm) of the scattering layer near an apex of the convex shape of the unit lens, p represents the lens pitch at which the unit lenses are arranged, and h represents a height from the apex to a bottom of the convex shape of the unit lens.

In the surface light source unit according to the present invention, the converging sheet may satisfy the relationship: $d \times (t/\phi) < 50\%$, in which d represents a volume ratio (%) of the light diffusing particles mixed in the scattering layer relative to the scattering layer, $\phi$ represents an average grain diameter (mm) of the light diffusing particles, and t represents a thickness (mm) of the scattering layer near an apex of the convex shape of the unit lens.

In the surface light source unit according to the present invention, each of the unit lenses may be a part of an elliptic cylinder with a major axis thereof perpendicular to the sheet face, or a spheroid formed by rotating an ellipsoid with a major axis thereof perpendicular to the sheet face, the ellipsoid being rotated about the major axis.

The present invention is a transmission type display comprising: a transmission type display member; and a surface light source unit disposed on a rear side of the transmission type display member, including: a light source member formed of a plurality of light sources arranged in parallel; and a converging sheet converging light from the light source member; wherein the converging sheet comprises: a light-emerging-side lens member formed of a plurality of unit lenses of convex shape that are arranged on a light-emerging side at a predetermined lens pitch; and a scattering layer that is formed along a surface of each unit lens, and scatters light.

In the transmission type display according to the present invention, a thickness of the scattering layer may be equal to or more than one-tenth the lens pitch, and equal to or less than the lens pitch.

In the transmission type display according to the present invention, the scattering layer may include light diffusing particles mixed in the scattering layer so as to scatter light.

In the transmission type display according to the present invention, the converging sheet may satisfy the relationship: $d \times ((t+h+p)/\phi) > 50\%$, in which d represents a volume ratio (%) of the light diffusing particles mixed in the scattering layer relative to the scattering layer, $\phi$ represents an average grain diameter (mm) of the light diffusing particles, t represents a thickness (mm) of the scattering layer near an apex of the convex shape of the unit lens, p represents the lens pitch at which the unit lenses are arranged, and h represents a height from the apex to a bottom of the convex shape of the unit lens.

In the transmission type display according to the present invention, the converging sheet may satisfy the relationship: $d \times (t/\phi) < 50\%$, in which d represents a volume ratio (%) of the light diffusing particles mixed in the scattering layer relative to the scattering layer, $\phi$ represents an average grain diameter (mm) of the light diffusing particles, and t represents a thickness (mm) of the scattering layer near an apex of the convex shape of the unit lens.

In the transmission type display according to the present invention, each of the unit lenses may be a part of an elliptic cylinder with a major axis thereof perpendicular to the sheet face, or a spheroid formed by rotating an ellipsoid with a major axis thereof perpendicular to the sheet face, the ellipsoid being rotated about the major axis.

According to the present invention, the following effects can be produced.

(1) The converging sheet includes a light-emerging-side lens member formed of a plurality of unit lenses of convex shape that are arranged on a light-emerging side, and a scattering layer that is formed along a surface of each unit lens and scatters light. Thus, light emerging from the converging sheet at a large emerging angle can be scattered, so that uniform illumination can be achieved so that the brightness of light on the display screen appears uniform regardless of the position from which the display screen is observed.

(2) The thickness of the scattering layer is equal to or more than one-tenth the lens pitch, and equal to or less than the lens pitch. Thus, the scattering layer can be reliably formed in the course of a path along which light that has been totally reflected and refracted travels to pass through the scattering layer, while the effects of the scattering layer can be sufficiently obtained.

(3) The scattering layer includes the light diffusing particles mixed in the scattering layer so as to scatter light. Since a scattering degree of light can be readily and freely adjusted, it is easy to form a scattering layer which is optimally adapted to a shape of a unit lens. Thus, an abrupt change in luminance and an increase in luminance in an oblique direction can be avoided so as to restrain a deterioration in image contrast.

(4) The converging sheet satisfies the relationship: $d \times ((t+h+p)/\phi) > 50\%$. Thus, a probability at which light emerging from at a large emerging angle is scattered can be increased.

(5) The converging sheet satisfies the relationship: $d \times (t/\phi) < 50\%$. Thus, a probability at which light emerging from at a small emerging angle is scattered can be decreased.

(6) Each of the unit lenses is a part of an elliptic cylinder with a major axis thereof perpendicular to the sheet face, or a spheroid formed by rotating an ellipsoid with a major axis thereof perpendicular to the sheet face, the ellipsoid being rotated about the major axis. Thus, as compared with a cylindrical or spherical unit lens, a degree of converging light can be freely controlled.

(7) The converging sheet mainly converges vertical light from a screen of the transmission type display member being used. Thus, light extending vertically on the screen of the transmission type display member can be gathered to elevate a front luminance. In general transmission type displays, a wide horizontal viewing angle is more desired than a wide vertical viewing angle. Thus, such converging sheet can be suitably used in most of the displays.

(8) A second converging sheet is provided for converging light in a direction perpendicular to the direction in which light is mainly converged by the first converging sheet. Since light on the screen of the transmission type display member can be independently converged in both the vertical and the horizontal directions of the screen, a viewing angle on the screen can be freely set.

DETAILED DESCRIPTION OF THE INVENTION

The present invention can achieve an object of uniformly illuminating a display to avoid non-uniformity in brightness of light, without increasing the number of optical sheets.

EXAMPLE 1

Figure 1:
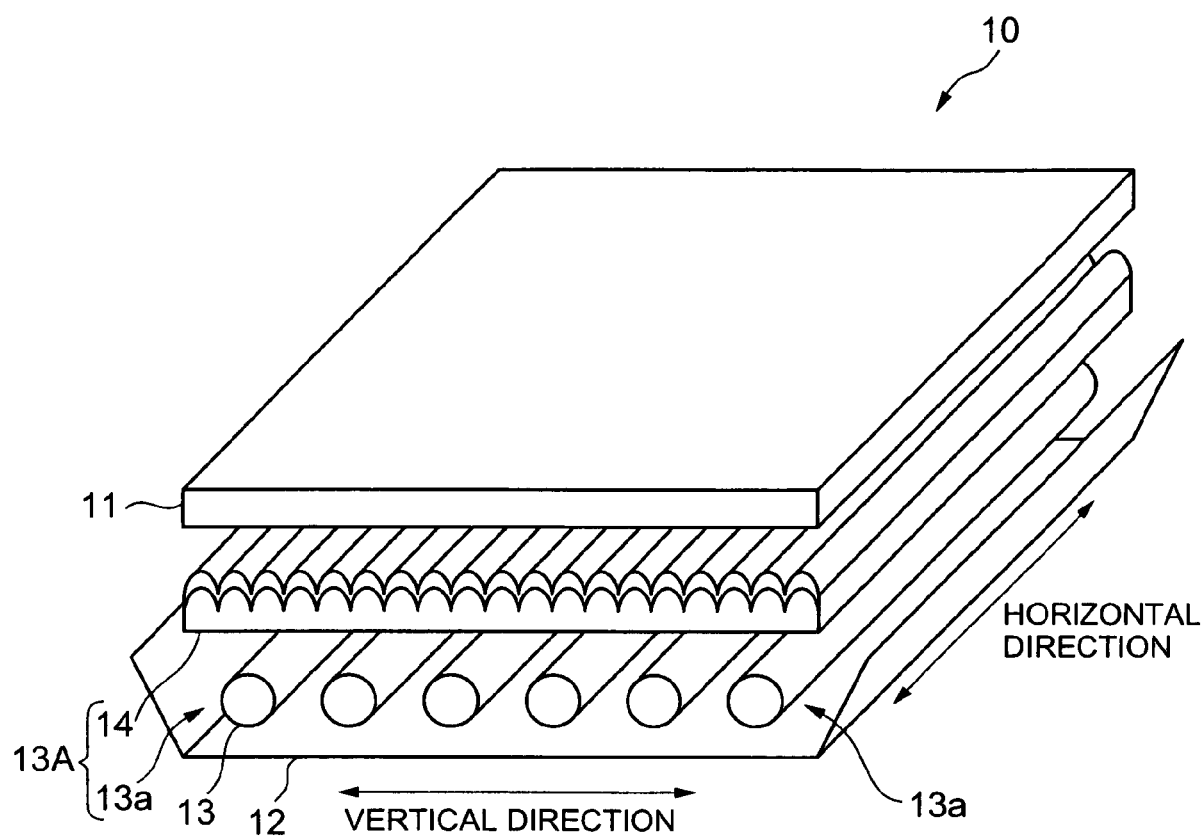
FIG. 1 is a view of an example 1 of a transmission type display according to the present invention.

FIG. 1 is a view of an example 1 of a transmission type display according to the present invention.

The following drawings including FIG. 1 are diagrammatic views, and the dimensions and the shapes of the parts shown in the drawings are suitably exaggerated in order to facilitate understanding.

A transmission type display 10 includes an LCD panel 11, a reflector 12, a plurality of arc tubes 13, and a converging sheet 14. The arc tubes 13 and the converging sheet 14 are placed between the LCD panel 11 and the reflector 12.

The arc tubes 13 are line light sources arranged in parallel that constitute a light source member 13a. A surface light source unit 13A is composed of the light source member 13a and the converging sheet 14.

The LCD panel 11 constitutes a transmission type display member (also referred to as a screen of the transmission type display member) as described below.

The LCD panel 11 is a transmission type display member formed of liquid crystal display devices of a transmission type. The LCD panel 11 is 30 inches in size, and is capable of displaying 800×600 dot matrix. The LCD panel 11 is used in such a manner that a longitudinal direction of the arc tubes 13 agrees with a horizontal direction, and a direction in which the arc tubes 13 are arranged agrees with a vertical direction (up and down direction).

The arc tubes 13 are line light sources of cold-cathode tubes forming a light source member of a backlight. In the example 1, six arc tubes 13 are arranged in parallel at regular intervals of about 75 mm.

The reflector 12 is disposed on the rear side of the arc tubes 13. This design allows substantially the uniform illumination of light incident on respective parts of the screen.

The converging sheet 14 is disposed between the arc tubes 13 and the LCD panel 11. Due to the converging sheet 14, light is converged to reach the LCD panel 11 with almost uniform luminance regardless of the position of the screen. That is, whether the position is close to the arc tube 13 or not has substantially no relation to the luminance on the screen.

Figure 2:
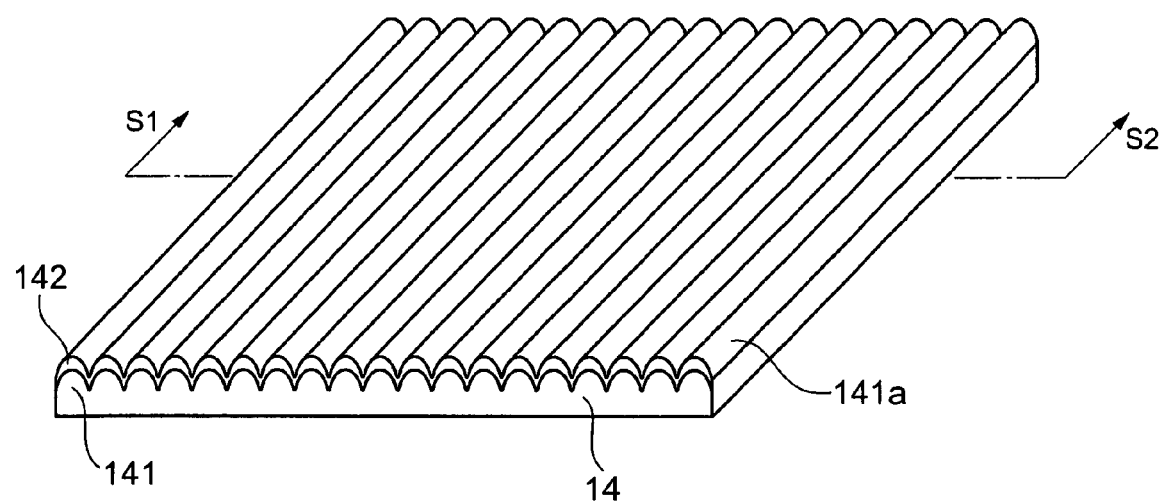
FIG. 2 is a perspective view of a converging sheet.

FIG. 2 is a perspective view of the converging sheet 14.

The converging sheet 14 converges light that has emerged from the arc tubes 13, and allows the converged light to emerge from the converging sheet 14. The converging sheet 14 includes a light-emerging-side lens member 141a formed of a plurality of unit lenses 141 of convex shape that are arranged on a light-emerging side at a predetermined lens pitch p, and a scattering layer 142 formed along a surface of each unit lens 141 to scatter light.

In the example 1, each of the unit lenses 141 in the light-emerging-side lens member 141a of the converging sheet 14 is a lenticular lens which is a part of an elliptic cylinder. The direction in which the unit lenses 141 are arranged agrees with the direction in which the arc tubes 13 are arranged (see, FIG. 1).

Figure 3:
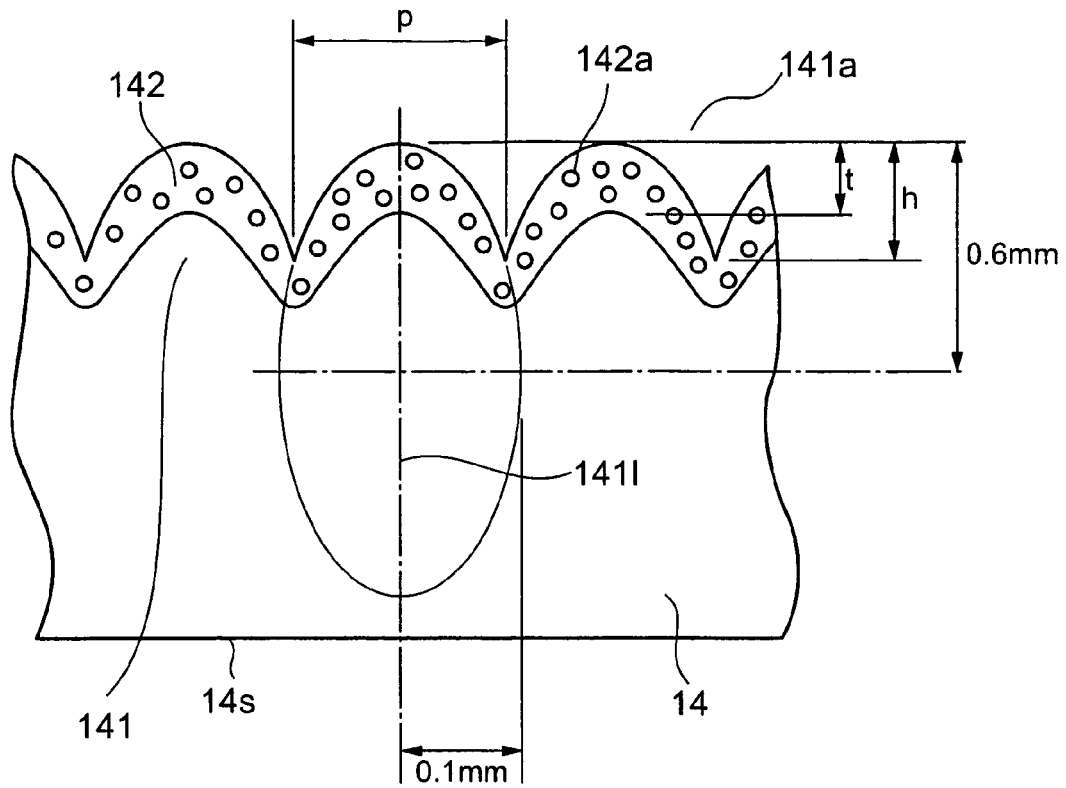
FIG. 3 is a sectional view of the converging sheet taken along the arrows S1-S2 of FIG. 2.

FIG. 3 is a sectional view of the converging sheet 14 taken along the arrows S1-S2 shown in FIG. 2.

Each of the unit lenses 141 in the light-emerging-side lens member 141a has an elliptical cross-section shown in FIG. 3, with the semi-major axis thereof being 0.6 mm and the semi-minor axis thereof being 0.1 mm. The unit lenses 141 are arranged such that a major axis thereof 141l is perpendicular to a sheet face 14s of the converging sheet 14, with a lens pitch p of 0.1 mm. A thickness of the converging sheet 14 is 2 mm.

The scattering layer 142 is formed inside a surface layer of the observation side (light-emerging side) of the unit lenses 141 along their convex shape. A thickness t of the scattering layer 142 near an apex of the unit lens 141 is 0.03 mm. A height h from the apex of the unit lens 141 to a bottom of the unit lens 141 is 0.08 mm. It is preferable that the thickness t of the scattering layer 142 be equal to or more than one-tenth the pitch p (p=0.1 mm in this example) at which the unit lenses 141 are arranged. The reason therefor is described below. The scattering layer 142 includes light diffusing particles 142a of titanium oxide mixed in the scattering layer 142. An average grain diameter φ of the light diffusing particles 142a is 100 nm (0.1 μm). A volume ratio d of the light diffusing particles 142a relative to the scattering layer 142 is 0.1%.

Figure 4:
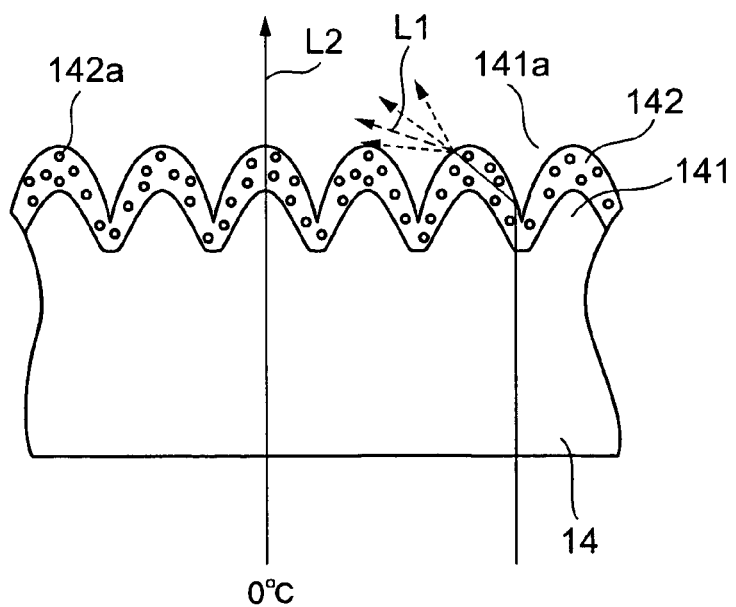
FIG. 4 is a view of paths along which light incident on the converging sheet at an incident angle of 0° from a side of arc tubes travels.

FIG. 4 is a view of paths along which light incident on the converging sheet 14 at an incident angle of 0° from a side of the arc tubes 13 travels.

Figure 5:
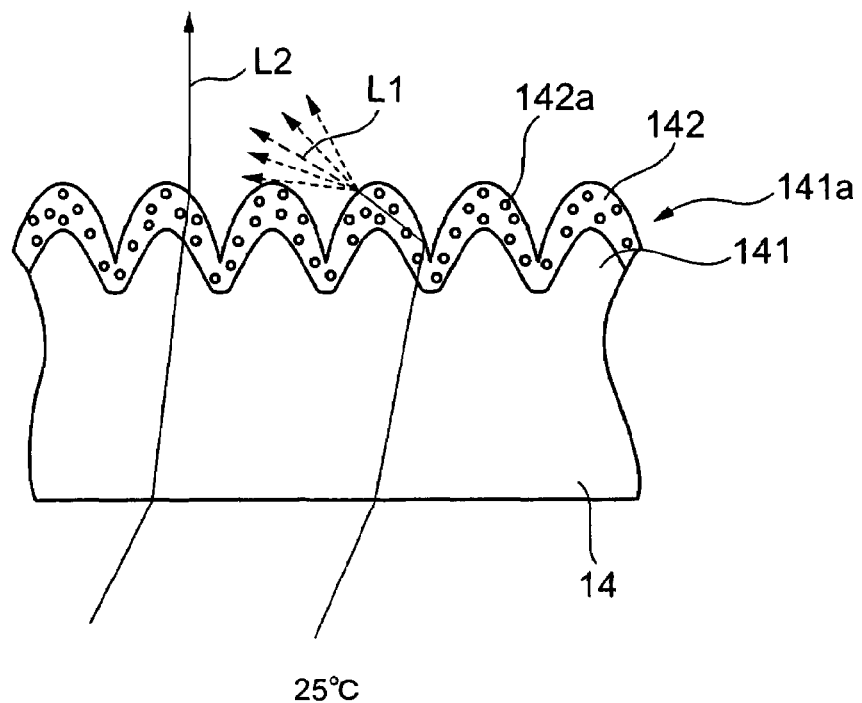
FIG. 5 is a view of paths along which light incident on the converging sheet at an incident angle of 25° from the side of the arc tubes travels.

FIG. 5 is a view of paths along which light incident on the converging sheet 14 at an incident angle of 25° from the side of the arc tubes 13 travels.

Figure 6:
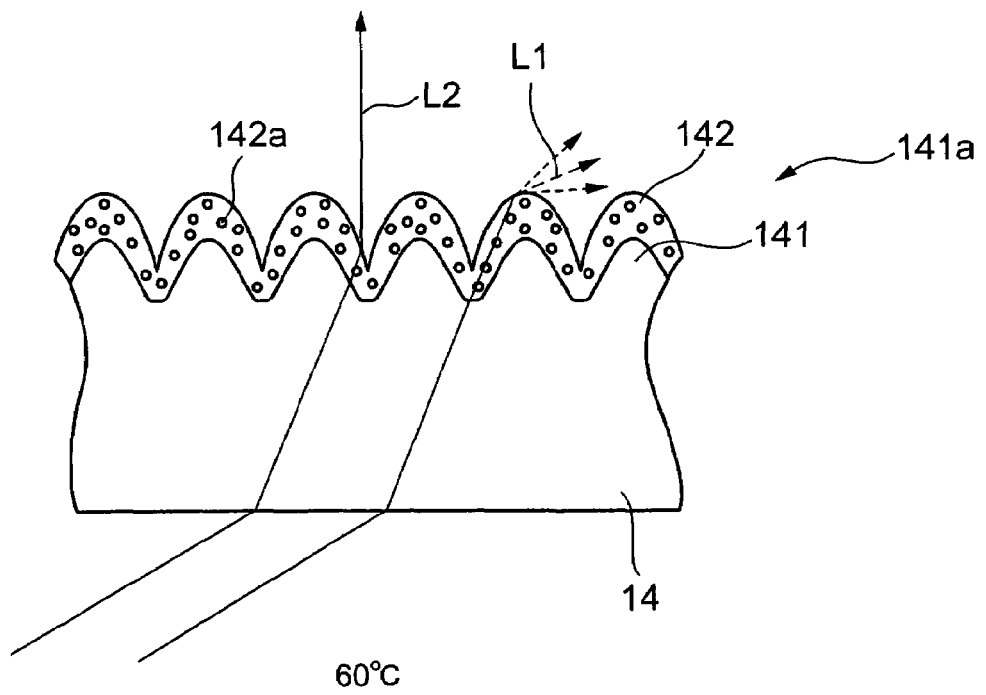
FIG. 6 is a view of paths along which light incident on the converging sheet at an incident angle of 60° from the side of the arc tubes travels.

FIG. 6 is a view of paths along which light incident on the converging sheet 14 at an incident angle of 60° from the side of the arc tubes 13 travels.

FIGS. 4 to 6 respectively show a scattering action of the scattering layer 142.

Comparing FIGS. 4 to 6 to each other, it is shown that most of light $L_1$ to emerge at large emerging angles from the converging sheet 14 travels along a surface shape of the unit lens 141. On the other hand, little of light $L_2$ to emerge at small emerging angles travels along the surface shape of the unit lens 141. Thus, it can be understood that, by the scattering layer 142 provided along the surface shape of the unit lens 141, the light $L_1$ to emerge at large emerging angles travels a longer distance to pass through the scattering layer 142, so that the light $L_1$ can be well scattered. That is, a part of the light $L_1$ that to emerge at large emerging angles in the absence of the scattering layer 142 is caused to emerge at small emerging angles by the scattering layer 142, while a part of other light is returned to the light source side and reused. As a result, the amount of light that unfavorably emerges at large emerging angles can be significantly decreased. In FIGS. 4 to 6, since the light $L_1$ to emerge at large emerging angles is scattered by the scattering layer 142, the luminance is lowered.

Meanwhile, regarding the light $L_2$ to emerge at small emerging angles in the absence of scattering layer 142, since the light $L_2$ travels a shorter distance to pass through the scattering layer 142, the proportion of the light $L_2$ to be scattered is small. Thus, most of the light $L_2$ can emerge at small emerging angles (see, FIGS. 4 to 6).

In order that the scattering layer 142 can most effectively control emerging angles, the following formula (1) is preferably satisfied:

$$d \times ((t+h+p)/\phi) > 50\% \quad \text{formula (1)}.$$

In this formula (1), d represents a volume ratio (%) of the light diffusing particles 142a, φ represents an average grain diameter (mm) of the light diffusing particles 142a, t represents a thickness (mm) of the scattering layer 142 near an apex of the convex shape of the unit lens 141, p represents the lens pitch at which the unit lenses 141 are arranged, and h represents a height from the apex to a bottom of the convex shape of the unit lens 141.

The formula (1) means that the light $L_1$, a large amount of which might travel along the surface shape of the unit lens 141 and emerge at large emerging angles in the absence of the scattering layer 142, strikes the light diffusing particles 142a and is scattered, at a probability of at least 50% or more. Namely, the value of the left side of the formula (1) is a value corresponding to the probability at which the light $L_1$ obliquely passing through the scattering layer 142 strikes the particles. From the viewpoint of decreasing light that emerges at large emerging angles, the value of the left side of the formula (1) is preferably more than 50%, and it can be said that the higher the value of the left side, the better it is. However, if the volume ratio of the light diffusing particles 142a is excessively increased, for example, so as to scatter almost all the light passing through the scattering layer 142, most of the light including light emerging at small emerging angles is unnecessarily scattered. In consequence, such converging sheet 14 is nothing more than one having a diffusing sheet merely disposed on a light-emerging side of the converging sheet 14.

Thus, in order not to excessively scatter the light $L_2$ which emerges at small emerging angles, the following formula (2) is preferably satisfied:

$$d \times (t/\phi) < 50\% \quad \text{formula (2)}.$$

The formula (2) means that the light that has entered the converging sheet 14 at an incident angle of 0°, or a large amount of which might emerge at small emerging angles in the absence of the scattering layer 142, strikes the light diffusing particles 142a and is scattered, at a probability of 50% or less. Namely, the value of the left side of the formula (2) is a value corresponding to the probability at which the light $L_2$ passing perpendicularly through the scattering layer 142 (light emerging at a small emerging angle) strikes the particles 142a.

When the property values of the converging sheet 14 in this example (t=0.03 mm, h=0.08 mm, d=0.1%, p=0.1 mm, φ=100 nm=0.0001 mm) are substituted in the formulas (1) and (2), the conditions thereof are satisfied as follows:

$$d \times ((t+h+p)/\phi) > 50\%$$

$$0.1\% \times ((0.03+0.08+0.1)/0.0001) > 50\%$$

$$210\% > 50\% \quad \text{[Formula (1)]}$$

$$d \times (t/\phi) < 50\%$$

$$0.1\% \times (0.03/0.0001) < 50\%$$

$$30\% < 50\% \quad \text{[Formula (2)]}$$

As stated above, the thickness t of the scattering layer 142 is preferably equal to or more than one-tenth the lens pitch p, and equal to or less than the lens pitch p. This is because the excessively increased thickness of the scattering layer 142 degrades the effect of the scattering layer 142, while the excessively decreased thickness thereof cannot cover the path in which that light which has been totally reflected and refracted travels the scattering layer 142. Further, such a thin layer is difficult to manufacture.

Figure 7:
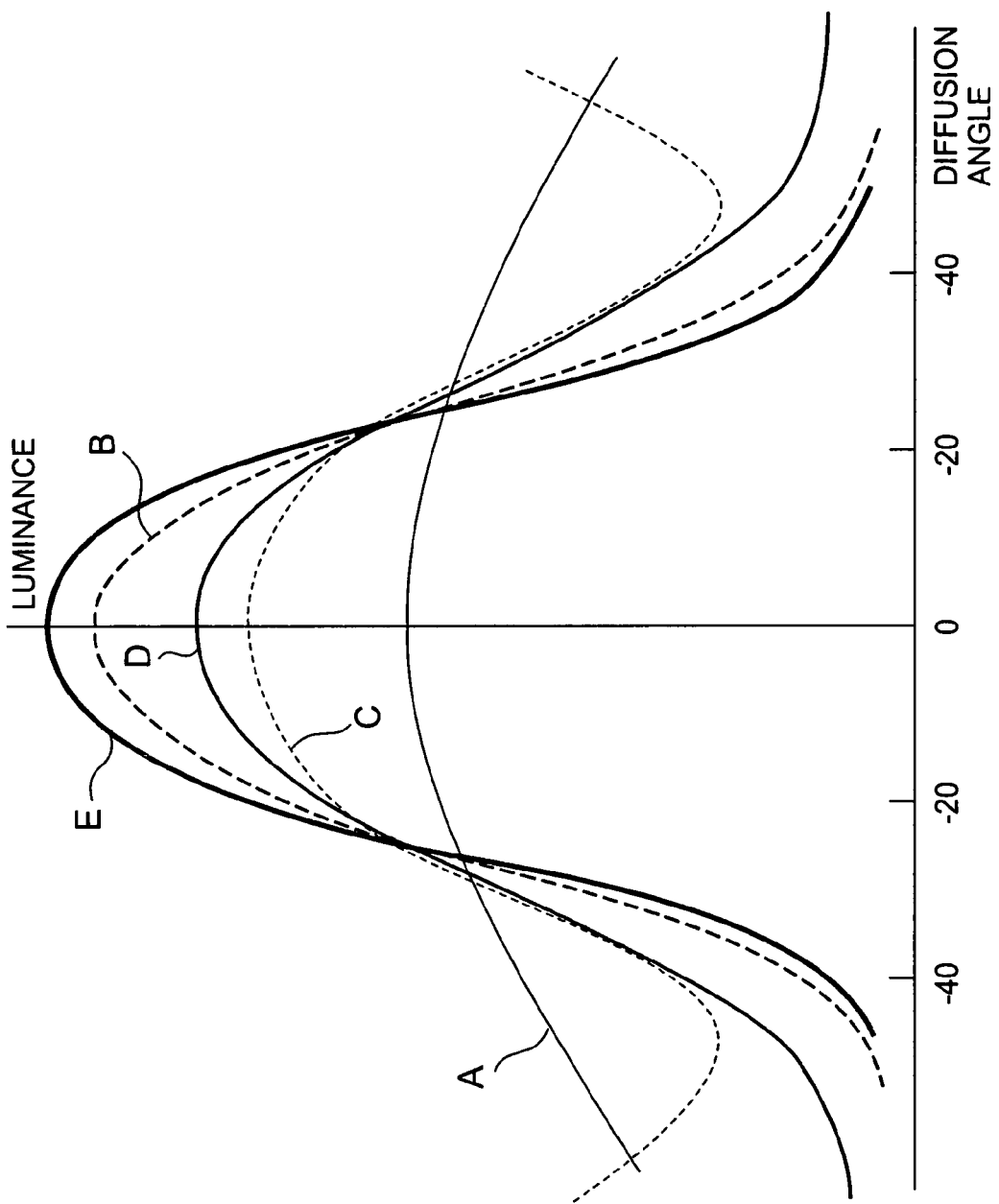
FIG. 7 is a diagram of luminance distributions in a vertical direction of optical sheets which are independently used in a surface light source unit.

FIG. 7 is a diagram of luminance distributions in a vertical direction of optical sheets which were independently used in the surface light source unit 13A. The diagram of FIG. 7 shows measured results of the luminance distributions of the optical sheets each of which was disposed on a position where the converging sheet 14 should be disposed in the surface light source unit 13A, with the LCD panel 11 being not yet placed.

The curve A shows a luminance distribution of a generally used diffusing sheet, the curve B shows that of the converging sheet 14, the curve C shows that of a comparative example, and the curve D shows that of a sheet of the same shape as the converging sheet 14 having a scattering effect like a scattering layer provided over the whole sheet. As the comparative example, there was prepared BEF (manufactured by Sumitomo 3M Limited, Japan) which is an optical sheet provided on its light-emerging side with a plurality of prism shapes each having an apex angle of 90°.

The diffusing sheet exhibiting the curve A intensively, uniformly diffused the light in all directions. Since a great deal of light emerged at unnecessary angular directions, a luminance on a required range was unfavorably lowered.

The converging sheet 14 in the example 1 exhibiting the curve B satisfies the formulas (1) and (2) as described above. Thus, light was able to be converged at a half-angle value of 35°, without any light emerging at a large emerging angle. There was found no luminance non-uniformity which might be caused by the arc tubes 13. As compared with the sheet exhibiting the curve D having the scattering effect provided on the whole sheet, the converging sheet 14 had a higher front luminance by about 5%.

When the optical sheet of the comparative example exhibiting the curve C was independently used instead of the converging sheet 14 in this example, light was converged at a half-value angle of 40°, and there was found needless light emerging at an emerging angle of 60° or more.

Therefore, according to the example 1, since the converging sheet 14 is provided with the scattering layer 142, light can be converged only at a required range, so that illumination light having a high luminance can be provided while avoiding a luminance non-uniformity.

EXAMPLE 2

Figure 8:
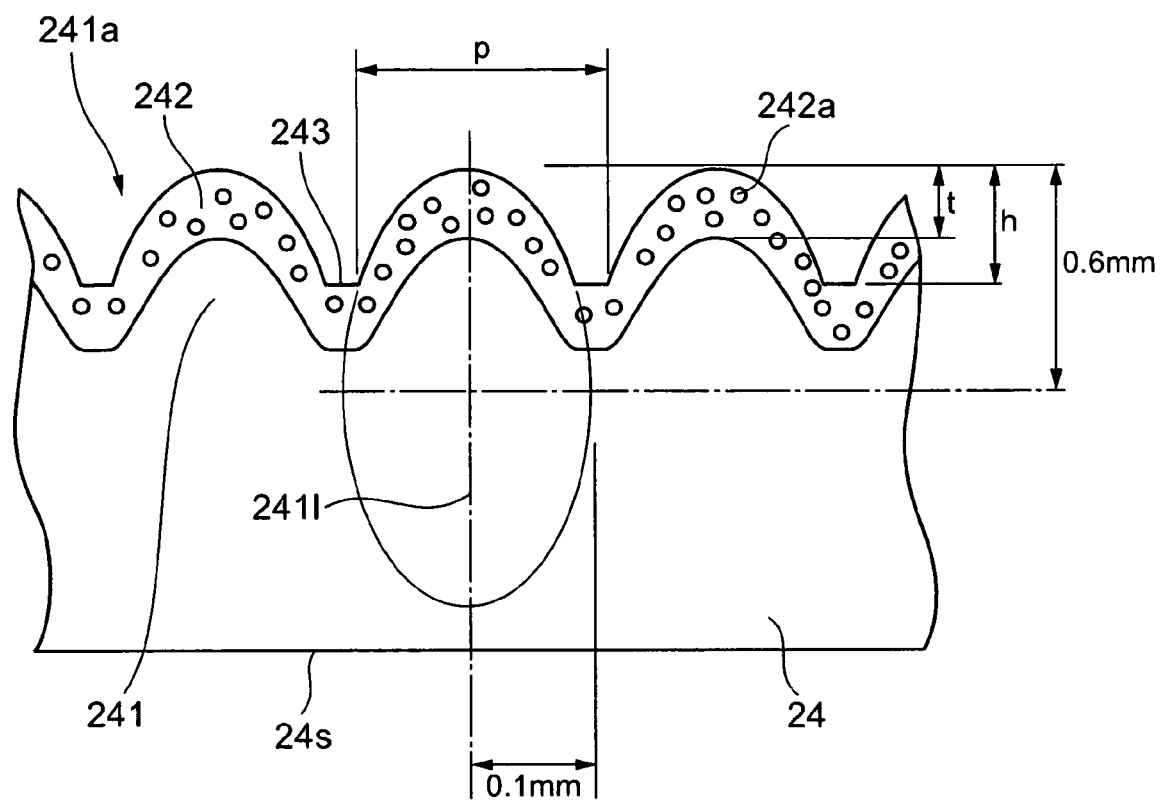
FIG. 8 is a view of an example 2 of the converging sheet according to the present invention.

FIG. 8 is a view of an example 2 of the converging sheet according to the present invention.

A transmission type display of the second example uses a converging sheet 24 which is obtained by improving the shape of the converging sheet 14 in the example 1, and other parts of the transmission type display in the example 2 are the same as those of the example 1. Thus, a description relating to the same parts having the same function as those in the example 1 is suitably omitted.

The converging sheet 24 converges light from the arc tubes 13, and allows the converged light to emerge from the converging sheet 24. A light-emerging-side lens member 241a is formed of a plurality of unit lenses 241 of convex shape that are arranged on a light-emerging side. A scattering layer 242 having a light-scattering function is formed on a predetermined range along a surface shape of the unit lens 241.

In this example, each of the unit lenses 241 in the light-emerging-side lens member 241a of the converging sheet 24 is a lenticular lens which is a part of an elliptic cylinder. The direction in which the unit lenses 241 are arranged agrees with the direction in which the arc tubes 13 are arranged.

Each of the unit lenses 241 has an elliptical cross-section shown in FIG. 8, with the semi-major axis thereof being 0.6 mm and the semi-minor axis thereof being 0.1 mm. The unit lenses 241 are arranged such that a major axis 241l thereof is perpendicular to a sheet face 24s of the converging sheet 24, with a lens pitch p of 0.12 mm. A thickness of the converging sheet 14 is 2 mm. A flat part 243 of 0.02 mm in width is formed between the adjacent unit lenses 241.

The scattering layer 242 is formed inside a surface layer of the observation side (light-emerging side) of the unit lenses 241 along their convex shape. A thickness t of the scattering layer 242 near an apex of the unit lens 241 is 0.03 mm. A height h from the apex of the unit lens 241 to the flat part 243 is 0.08 mm. The scattering layer 242 includes light diffusing particles 242a of titanium oxide mixed in the scattering layer 242. An average grain diameter φ of the light diffusing particles 242a is 100 mn (0.1 μm). A volume ratio d of the light diffusing particles 242a relative to the scattering layer 242 is 0.07%.

In the example 2, when the property values of the converging sheet 24 (t=0.03 mm, h=0.08 mm, d=0.07%, p=0.12 mm, φ=100 nm=0.0001 mm) are substituted in the formulas (1) and (2), the conditions thereof are satisfied as follows:

$$d \times ((t+h+p)/\phi)) > 50\%$$

$$0.07\% \times ((0.03+0.08+0.12)/0.0001) > 50\%$$

$$161\% > 50\% \quad \text{[Formula (1)]}$$

$$d \times (t/\phi) < 50\%$$

$$0.07\% \times (0.03/0.0001) < 50\%$$

$$21\% < 50\% \quad \text{[Formula (2)]}$$

Similar to the example 1, the luminance distribution of the converging sheet 24 of the example 2 was examined. The result is shown by the curve E in FIG. 7. Since the converging sheet 24 of the example 2 exhibiting the curve E satisfies the formulas (1) and (2) as described above, when the converging sheet 24 was independently used in the surface light unit with the LCD panel 11 being not yet placed, the light could be converged at a half-value angle of 30°, without any light emerging at a large emerging angle. There was found no luminance non-uniformity which might be caused by the arc tubes 13. A normal luminance was able to be more elevated as compared with that of the example 1. The reason for the narrowed half-value angle and the elevated normal luminance as compared with those of the example 1 is that the flat part 243 provided in the converging sheet 24 allows the increased amount of light to directly emerge therefrom in the normal line direction. Even when there is light that has emerged from the flat part 243 at large angles, such light again enters the unit lens 241 and is scattered by the scattering layer 242.

According to the example 2, the light can be further converged as compared with the example 1.

Modification

The present invention is not limited to the above-described examples, and various modifications and variations can be made which are within the equivalent scope of the present invention.

Figure 9:
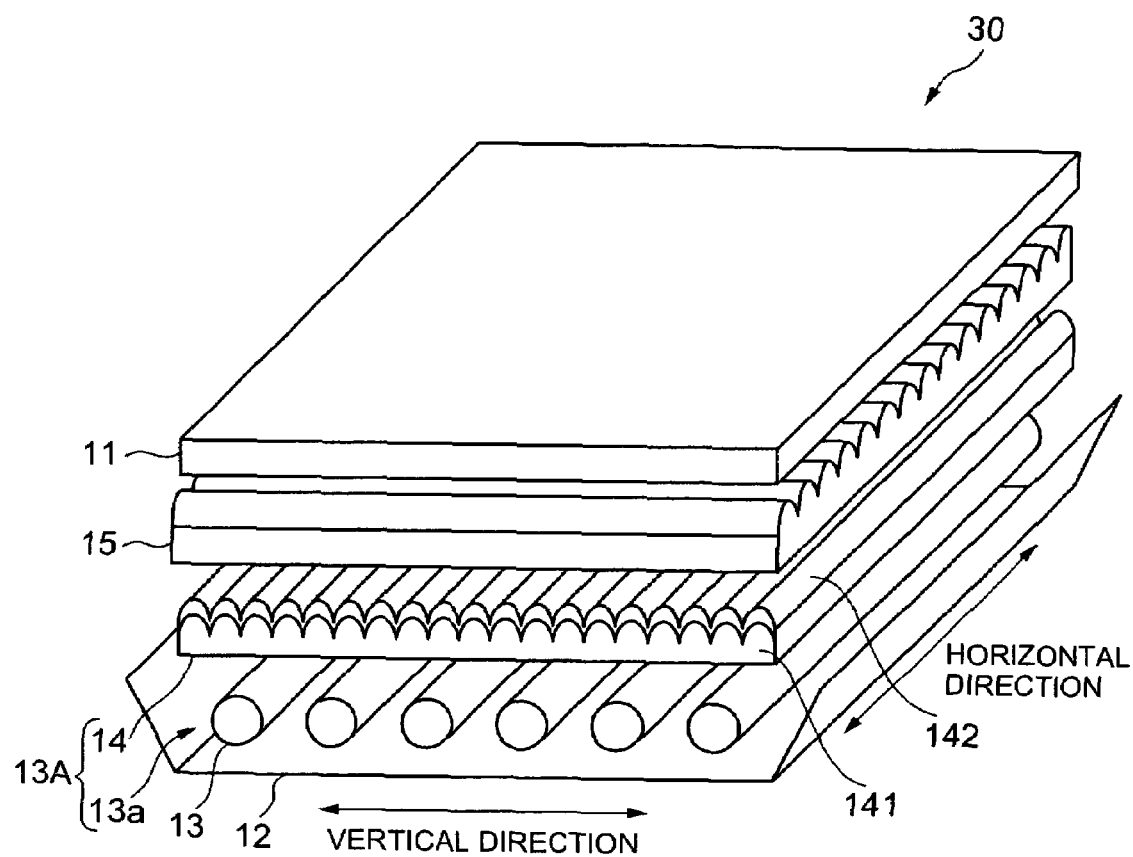
FIG. 9 is a view of a modification in which a second optical sheet is added, that controls light in a direction perpendicular to a direction in which light is mainly controlled by the converging sheet.

(1) In the respective examples, the converging sheet 14 is used. However, not limited thereto, a second converging sheet may be added which controls light in a direction perpendicular to the direction in which the converging sheet 14 mainly controls light. FIG. 9 is a view of a modification in which a second converging sheet 15 is added, that controls light in a direction perpendicular to a direction in which the converging sheet 14 mainly controls light. In the modification shown in FIG. 9, the second converging sheet 15 is formed of a conventional lenticular lens sheet having no scattering layer. However, a second converging sheet having a scattering layer similar to the converging sheet 14 may be disposed perpendicularly thereto. With a provision of the second converging sheet 15, light can be converged in both vertical and horizontal directions. Thus, the light can be more effectively used, so that brightness of the illumination light becomes higher.

(2) In the respective examples, the scattering layers 142 and 242 are formed integrally with the unit lenses 141 and 241 on the observation side, respectively. However, not limited thereto, the scattering layers 142 and 242 may be additionally disposed on the unit lenses 141 and 242 on the observation side thereof.

(3) In the respective examples, the shapes of the unit lenses 141 and 241 are a part of a continuous elliptic cylinder, with the major axes 141l and 242l being perpendicular to the sheet faces 14s and 24s. However, not limited thereto, the shapes of the unit lenses 141 and 242 may be a part of a spheroid formed by rotating an ellipsoid, with the major axis 141l and 241l perpendicular to the sheet faces 14s and 24s, the ellipsoid being rotated about the major axes 141l and 241l.

(4) Next, referring to FIGS. 10(a) to 10(g), modifications of the unit lenses 141 and 241 in the converging sheet 14 and 24 are described.

Figure 10:
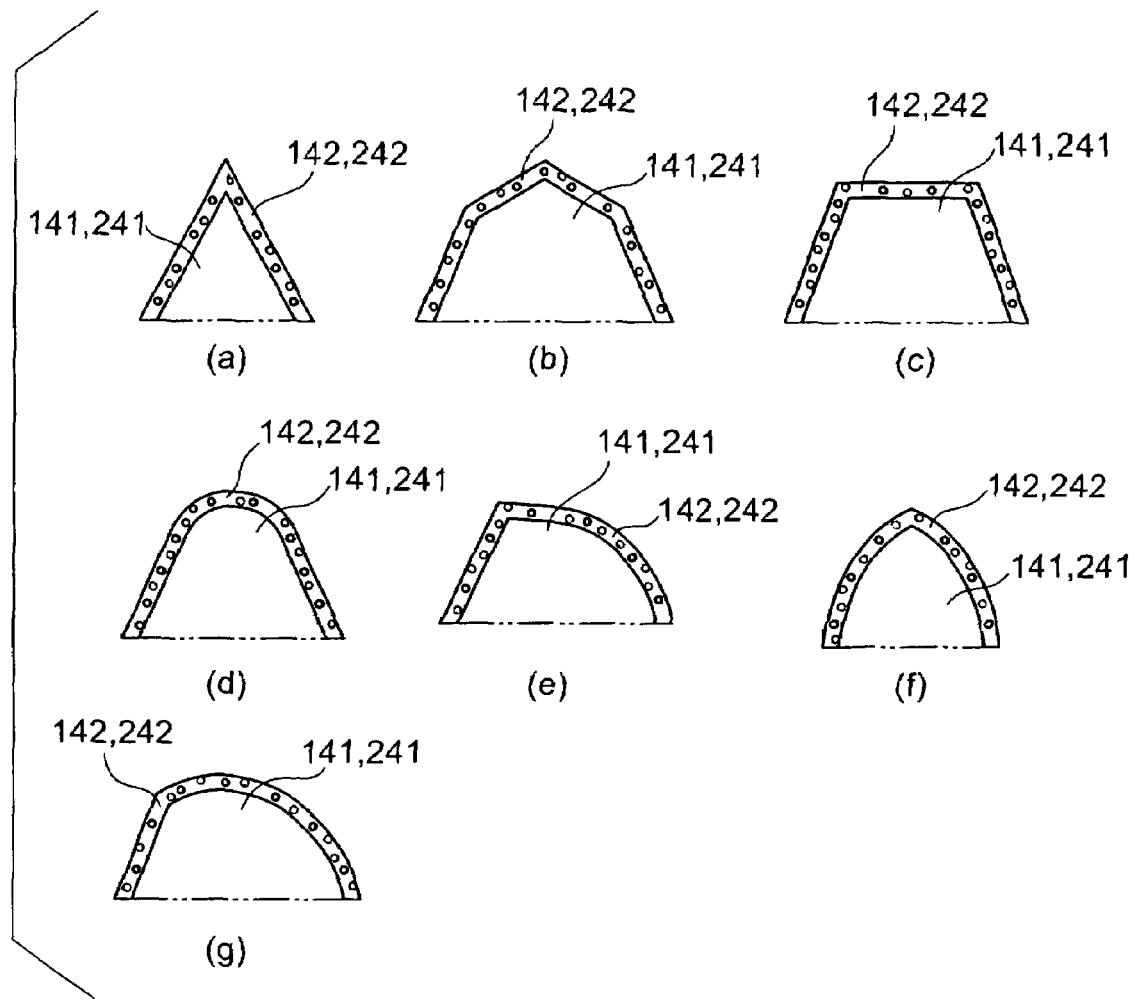
FIGS. 10(a) to 10(g) are views of modifications of a unit lens in the converging sheet.

As shown in FIG. 10(a), each of the unit lenses 141 or 241 may have a triangular pole shape having a triangular cross-section. The unit lenses 141 or 241 extend in parallel on the sheet face 14s or 24s. As shown in FIG. 10(b), each of the unit lenses 141 or 241 may have a polyangular pole shape having a pentangular cross-section. The unit lenses 141 or 241 extend in parallel on the sheet face 14s or 24s.

As shown in FIG. 10(c), each of the unit lenses 141 or 241 may have a trapezoidal pole shape having a trapezoidal cross-section. The unit lenses 141 or 241 extend in parallel on the sheet face 14s or 24s. Alternatively, each of the unit lenses 141 or 241 may have a substantially triangular pole shape having substantially a triangular cross-section (FIG. 10(d)). In FIG. 10(d), an apex of the cross-section is round-shaped.

As shown in FIG. 10(e), each of the unit lenses 141 or 241 may have a substantially triangular pole shape having substantially a triangular cross-section. The unit lenses 141 or 241 extend in parallel on the sheet face 14s or 24s. The cross-section is formed by a straight line and a curved line.

As shown in FIG. 10(f), each of the unit lenses 141 and 241 may have a substantially triangular pole shape having substantially a triangular cross-section. The unit lenses 141 or 241 extend in parallel on the sheet face 14s or 24s. The cross-section includes two curved lines.

As shown in FIG. 10(g), each of the unit lenses 141 or 241 may have a substantially triangular pole shape having substantially a triangular cross-section. The unit lenses 141 or 241 extend in parallel on the sheet face 14s and 24s. The cross-section is formed of a straight line and a curved line, with a part where the straight line and the curved line meet being curved.

Alternatively, the shape of the unit lens 141 or 241 is not limited to a pole shape, and may be a circular cone shape or a pyramid shape projecting perpendicularly from the sheet face 14s or 24s.

The invention claimed is:

1. A converging sheet disposed in a surface light source unit containing a light source member formed of a plurality of light sources arranged in parallel, the converging sheet having a sheet face and converging light from the light source member, the converging sheet comprising:
   a lens member formed of a plurality of unit lenses of convex shape that are arranged on a light-emerging side of the converging sheet at a predetermined lens pitch; and
   a scattering layer that is formed in direct contact with the plurality of unit lenses so that the scattering layer conforms to the shape of the plurality of unit lenses
   wherein each unit lens and an associated portion of said scattering layer converges some of the light that enters a light-incident side of the converging sheet and diffuses the remainder of the light that enters the light-incident side of the converging sheet, thereby increasing the front luminance of the light emitted from the converging sheet.

2. The converging sheet according to claim 1, wherein a thickness of the scattering layer is equal to or more than one-tenth the lens pitch, and equal to or less than the lens pitch.

3. The converging sheet according to claim 1, wherein the scattering layer includes light diffusing particles mixed in the scattering layer so as to scatter light.

4. The converging sheet according to claim 3, wherein the converging sheet satisfies the relationship:

$$d \times ((t+h+p)/\phi) > 50\%, \text{ in which}$$

d represents a volume ratio (%) of the light diffusing particles mixed in the scattering layer relative to the scattering layer, $\phi$ represents an average grain diameter (mm) of the light diffusing particles, t represents a thickness (mm) of the scattering layer near an apex of the convex shape of the unit lens, p represents the lens pitch at which the unit lenses are arranged, and h represents a height from the apex to a bottom of the convex shape of the unit lens.

5. The converging sheet according to claim 3, wherein the converging sheet satisfies the relationship:

$$d \times (t/\phi) < 50\%, \text{ in which}$$

d represents a volume ratio (%) of the light diffusing particles mixed in the scattering layer relative to the scattering layer, $\phi$ represents an average grain diameter (mm) of the light diffusing particles, and t represents a thickness (mm) of the scattering layer near an apex of the convex shape of the unit lens.

6. The converging sheet according to claim 1, wherein each of the unit lenses is a part of an elliptic cylinder with a major axis thereof perpendicular to the sheet face, or a spheroid formed by rotating an ellipsoid with a major axis thereof perpendicular to the sheet face, the ellipsoid being rotated about the major axis.

7. A surface light source unit disposed on a rear side of a transmission type display member, comprising:
   a light source member formed of a plurality of light sources arranged in parallel; and
   a converging sheet having a sheet face and converging light from the light source member; wherein
   the converging sheet comprises:
   a lens member formed of a plurality of unit lenses of convex shape that are arranged on a light-emerging side of the converging sheet at a predetermined lens pitch, and
   a scattering layer that is formed in direct contact with the plurality of unit lenses so that the scattering layer conforms to the shape of the plurality of unit lenses,
   wherein each unit lens and an associated portion of said scattering layer converges some of the light that enters a light-incident side of the converging sheet and diffuses the remainder of the light that enters the light-incident side of the converging sheet, thereby increasing the front luminance of the light emitted from the converging sheet.

8. The surface light source unit according to claim 7, wherein
   the converging sheet converges vertical light from a screen of the transmission type display member.

9. The surface light source unit according to claim 8, further comprising:
   a second converging sheet converging light in a direction perpendicular to the direction in which light is converged by the converging sheet.

10. The surface light source unit according to claim 7, wherein
    a thickness of the scattering layer is equal to or more than one-tenth the lens pitch, and equal to or less than the lens pitch.

11. The surface light source unit according to claim 7, wherein
    the scattering layer includes light diffusing particles mixed in the scattering layer so as to scatter light.

12. The surface light source unit according to claim 11, wherein
    the converging sheet satisfies the relationship:

$$d \times ((t+h+p)/\phi) > 50\%, \text{ in which}$$

d represents a volume ratio (%) of the light diffusing particles mixed in the scattering layer relative to the scattering layer, $\phi$ represents an average grain diameter (mm) of the light diffusing particles, t represents a thickness (mm) of the scattering layer near an apex of the convex shape of the unit lens, p represents the lens pitch at which the unit lenses are arranged, and h represents a height from the apex to a bottom of the convex shape of the unit lens.

13. The surface light source unit according to claim 11, wherein
    the converging sheet satisfies the relationship:

$$d \times (t/\phi) < 50\%, \text{ in which}$$

d represents a volume ratio (%) of the light diffusing particles mixed in the scattering layer relative to the scattering layer, $\phi$ represents an average grain diameter (mm) of the light diffusing particles, and t represents a thickness (mm) of the scattering layer near an apex of the convex shape of the unit lens.

14. The surface light source unit according to claim 7, wherein
    each of the unit lenses is a part of an elliptic cylinder with a major axis thereof perpendicular to the sheet face, or a spheroid formed by rotating an ellipsoid with a major axis thereof perpendicular to the sheet face, the ellipsoid being rotated about the major axis.

15. A transmission type display comprising:

a transmission type display member; and a surface light source unit disposed on a rear side of the transmission type display member, including: a light source member formed of a plurality of light sources arranged in parallel; and a converging sheet converging light from the light source member; wherein the converging sheet comprises:

a lens member formed of a plurality of unit lenses of convex shape that are arranged on a light-emerging side of the converging sheet at a predetermined lens pitch; and a scattering layer that is formed in direct contact with the plurality of unit lenses so that the scattering layer conforms to the shape of the plurality of unit lenses, wherein each unit lens and associated portion of said scattering layer converges some of the light that enters a light-incident side of the converging sheet and diffuses the remainder of the light that enters the light-incident side of the converging sheet, thereby increasing the front luminance of the light emitted from the converging sheet.

16. The transmission type display according to claim 15, wherein a thickness of the scattering layer is equal to or more than one-tenth the lens pitch, and equal to or less than the lens pitch.

17. The transmission type display according to claim 15, wherein the scattering layer includes light diffusing particles mixed in the scattering layer so as to scatter light.

18. The transmission type display according to claim 17, wherein the converging sheet satisfies the relationship:

$d \times ((t+h+p)/\phi) > 50\%$, in which d represents a volume ratio (%) of the light diffusing particles mixed in the scattering layer relative to the scattering layer, $\phi$ represents an average grain diameter (mm) of the light diffusing particles, t represents a thickness (mm) of the scattering layer near an apex of the convex shape of the unit lens, p represents the lens pitch at which the unit lenses are arranged, and h represents a height from the apex to a bottom of the convex shape of the unit lens.

19. The transmission type display according to claim 17, wherein the converging sheet satisfies the relationship:

$d \times (t/\phi) < 50\%$, in which d represents a volume ratio (%) of the light diffusing particles mixed in the scattering layer relative to the scattering layer, $\phi$ represents an average grain diameter (mm) of the light diffusing particles, and t represents a thickness (mm) of the scattering layer near an apex of the convex shape of the unit lens.

20. The transmission type display according to claim 15, wherein each of the unit lenses is a part of an elliptic cylinder with a major axis thereof perpendicular to the sheet face, or a spheroid formed by rotating an ellipsoid with a major axis thereof perpendicular to the sheet face, the ellipsoid being rotated about the major axis.

21. The converging sheet of claim 1, wherein the plurality of unit lenses of convex shape are formed only on the light emerging side of the converging sheet.

22. The converging sheet of claim 7, wherein the plurality of unit lenses of convex shape are formed only on the light emerging side of the converging sheet.

23. The converging sheet of claim 15, wherein the plurality of unit lenses of convex shape are formed only on the light emerging side of the converging sheet.

* * * * *